(12) United States Patent
Vermeulen

(10) Patent No.: US 11,958,606 B2
(45) Date of Patent: Apr. 16, 2024

(54) AIRCRAFT LAVATORY SYSTEMS

(71) Applicant: B/E AEROSPACE, INC., Winston Salem, NC (US)

(72) Inventor: Timothy Vermeulen, Nieuwegein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 292 days.

(21) Appl. No.: 17/339,428

(22) Filed: Jun. 4, 2021

(65) Prior Publication Data

US 2021/0380252 A1    Dec. 9, 2021

Related U.S. Application Data

(60) Provisional application No. 63/035,488, filed on Jun. 5, 2020.

(51) Int. Cl.
| | | |
|---|---|---|
| *B64D 11/00* | (2006.01) | |
| *G06F 3/0482* | (2013.01) | |
| *G06Q 10/02* | (2012.01) | |

(52) U.S. Cl.
CPC ........ *B64D 11/0015* (2013.01); *G06F 3/0482* (2013.01); *G06Q 10/02* (2013.01)

(58) Field of Classification Search
CPC ..... B64D 11/0015; B64D 11/02; B64D 11/00; G06Q 10/02; G06Q 10/06315; G06Q 10/00; G06Q 10/04; G06Q 10/06; G06Q 10/08; G06Q 10/10; G06Q 10/20; G06Q 10/30; H04W 68/00; G06F 3/0482

See application file for complete search history.

(56) References Cited

U.S. PATENT DOCUMENTS

| | | | |
|---|---|---|---|
| 6,329,919 | B1 | 12/2001 | Boies et al. |
| 8,005,656 | B1 | 8/2011 | Ankory et al. |
| 10,185,921 | B1 * | 1/2019 | Heller ...................... G07C 9/38 |

(Continued)

FOREIGN PATENT DOCUMENTS

JP    2001187180 A    7/2001

OTHER PUBLICATIONS

Extended European search report issued in corresponding EP application No. 21178085.3, dated Nov. 3, 2021. (8 pages).

(Continued)

*Primary Examiner* — James J Yang
*Assistant Examiner* — Anthony D Afrifa-Kyei
(74) *Attorney, Agent, or Firm* — SNELL & WILMER L.L.P.

(57) ABSTRACT

A queue system for a lavatory of an aircraft can include an infotainment system configured to receive a user input and to output a request to use the lavatory associated with a seat or occupant, and a queue module operatively connected to the infotainment system. The queue module can be configured to receive the request from the infotainment system and to create and/or modify a virtual lavatory queue based on a request hierarchy of the request to position the request in the virtual lavatory queue, and output a vacancy indicator signal to the infotainment system when the request is at a front of the virtual lavatory queue. The infotainment system can be configured to receive the vacancy indicator signal and display an indication to indicate to a user of the infotainment system that it is the user's turn in the queue.

13 Claims, 9 Drawing Sheets

(56) References Cited

U.S. PATENT DOCUMENTS

2006/0291632 A1* 12/2006 Mpare .................... G07C 11/00
                                                              379/88.22
2007/0241927 A1    10/2007 Ratnakar
2009/0112638 A1*  4/2009 Kneller .................. G06Q 10/00
                                                                  705/5

OTHER PUBLICATIONS

Office Action from the European Patent Office for European Patent No. EP21178085.3, dated Aug. 25, 2023.

* cited by examiner

3B. Your position will also be shown in the top menu

4A. A pop-up menu will alarm you when you are first in line

4B. After your visit to the lavatory, you will have to click to remove yourself from the list

AIRCRAFT LAVATORY SYSTEMS

CROSS-REFERENCE TO RELATED APPLICATIONS

This application claims priority to and the benefit of U.S. Provisional Application No. 63/035,488, filed Jun. 5, 2020, the entire contents of which are herein incorporated by reference in their entirety.

FIELD

This disclosure relates to aircraft systems.

BACKGROUND

In traditional aircraft, passengers who desire to use the lavatory frequently congregate in a line at the lavatory door. This is both inefficient and creates increased health and safety risks due to unwanted/unnecessary movement through the aisles of the aircraft.

Such conventional methods and systems have generally been considered satisfactory for their intended purpose. However, there is still a need in the art for improved health and safety measures in the cabin, such as an aircraft lavatory system. The present disclosure provides a solution for this need.

SUMMARY

A queue system for a lavatory of an aircraft can include an infotainment system configured to receive a user input and to output a request to use the lavatory associated with a seat or occupant, and a queue module operatively connected to the infotainment system. The queue module can be configured to receive the request from the infotainment system and to create and/or modify a virtual lavatory queue based on a request hierarchy of the request to position the request in the virtual lavatory queue, and output a vacancy indicator signal to the infotainment system when the request is at a front of the virtual lavatory queue. The infotainment system can be configured to receive the vacancy indicator signal and display an indication to indicate to a user of the infotainment system that it is the user's turn in the queue.

The infotainment system can include a graphical user interface (GUI) with one or more digital buttons to be selected by a user to either output the request to use the lavatory to the queue module or to navigate to a lavatory pane to allow outputting of the request from the lavatory pane. The one or more digital buttons can include a lavatory icon button.

The GUI can include a banner pane having the one or more digital buttons located therein. The banner pane can either overlay a main pane or divide a screen to have a main pane and the banner pane. The banner pane can be configured to drop down with a user input and/or to autohide after a period of time without a user input.

The queue module can be configured to output lavatory information. The infotainment system can be configured to receive the lavatory information from the queue module and to display the lavatory information. For example, the lavatory information can include a number indicating a position in the virtual lavatory queue.

In certain embodiments, selecting the lavatory icon button can cause a lavatory pane of the GUI to pop up with a confirmation button to send the request to use the lavatory to the queue module. The queue module can be configured to output the virtual queue to the infotainment system. The infotainment system can be configured to display the virtual lavatory queue on the lavatory pane.

The GUI can include a removal button on the lavatory pane configured send a removal signal when selected to the queue module to remove the associated seat and/or user from the virtual lavatory queue. In certain embodiments, the lavatory pane can be closed or minimized by the user.

The GUI can be configured to generate a pop-up alarm pane upon receiving the vacancy indicator signal indicating that the user is first in line in the virtual lavatory queue. In certain embodiments, the queue system can be configured to output lavatory specific instructions to the infotainment system. The infotainment system can be configured to provide the lavatory specific instructions in the pop-up alarm pane to instruct the user which lavatory to use and/or provide directions to the lavatory to be used.

In certain embodiments, the queue system can be configured to determine which lavatory of a plurality of lavatories the seat or occupant is authorized to use based on one or more assignment criteria. For example, the assignment criteria can be or includes one or more of seat location of the requesting user, operability of one or more lavatories, and/or an aisle congestion due to crew and/or crew carts. In certain embodiments, the assignment criteria can be based on a defined proximity to an occupant suspected of having a transmissible disease, or a common lavatory used by an occupant suspected of having a transmissible disease such that a requesting user who has already used a lavatory that was also used by an occupant suspected of having a transmissible disease will be assigned the same lavatory for the duration of the flight.

The alarm pane can include an end button configured to cause the infotainment system to send a finished signal to the queue module when selected by the user to cause the queue module to iterate the queue. The alarm pane can also be closed upon selecting the end button allowing the user to indicate to that the user is finished using the lavatory.

In accordance with at least one aspect of this disclosure, an infotainment system for a seatback of an aircraft can be configured to accept inputs for and to display information from a virtual lavatory queue module on the aircraft to allow an occupant to enter a virtual lavatory queue. The infotainment system can include a graphical user interface (GUI) configured to allow the occupant to send a request to use a lavatory, alert the occupant when and/or which lavatory is available for use by the occupant, and require the occupant to provide an input to the GUI to cause the infotainment system to send an indication to the virtual lavatory queue module that the occupant has returned to their seat to cause the virtual lavatory queue module to iterate the virtual lavatory queue. The infotainment system can be utilized in any suitable aircraft, and/or have any suitable components (e.g., a touchscreen). An aircraft can include a plurality (e.g., one for each occupant or passenger) of infotainment systems as disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
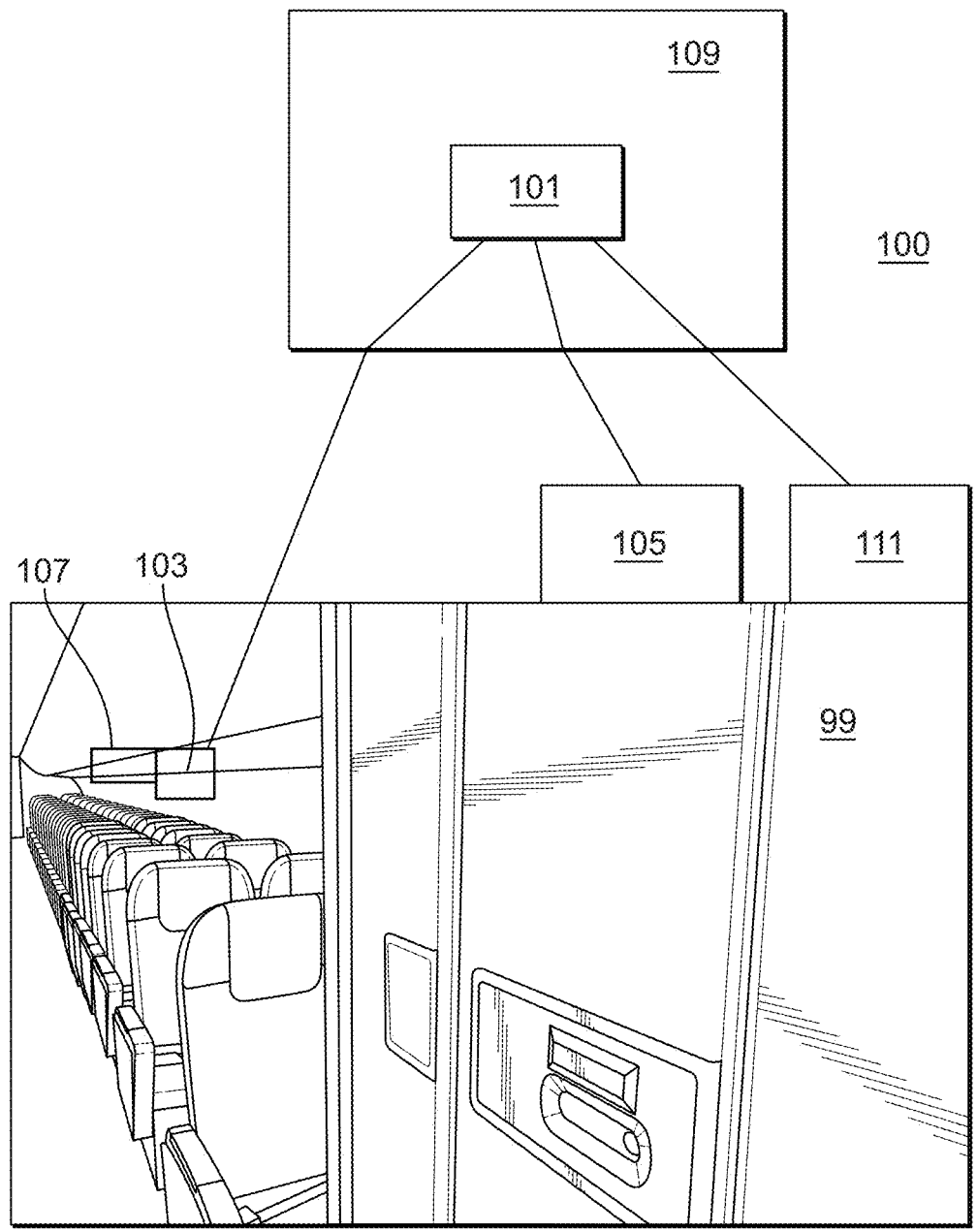
FIG. 1 is a schematic of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-9B. Certain embodiments described herein can be used to provide organization and prevent congregation in the aisle of an aircraft near a lavatory, for example.

Figure 2:
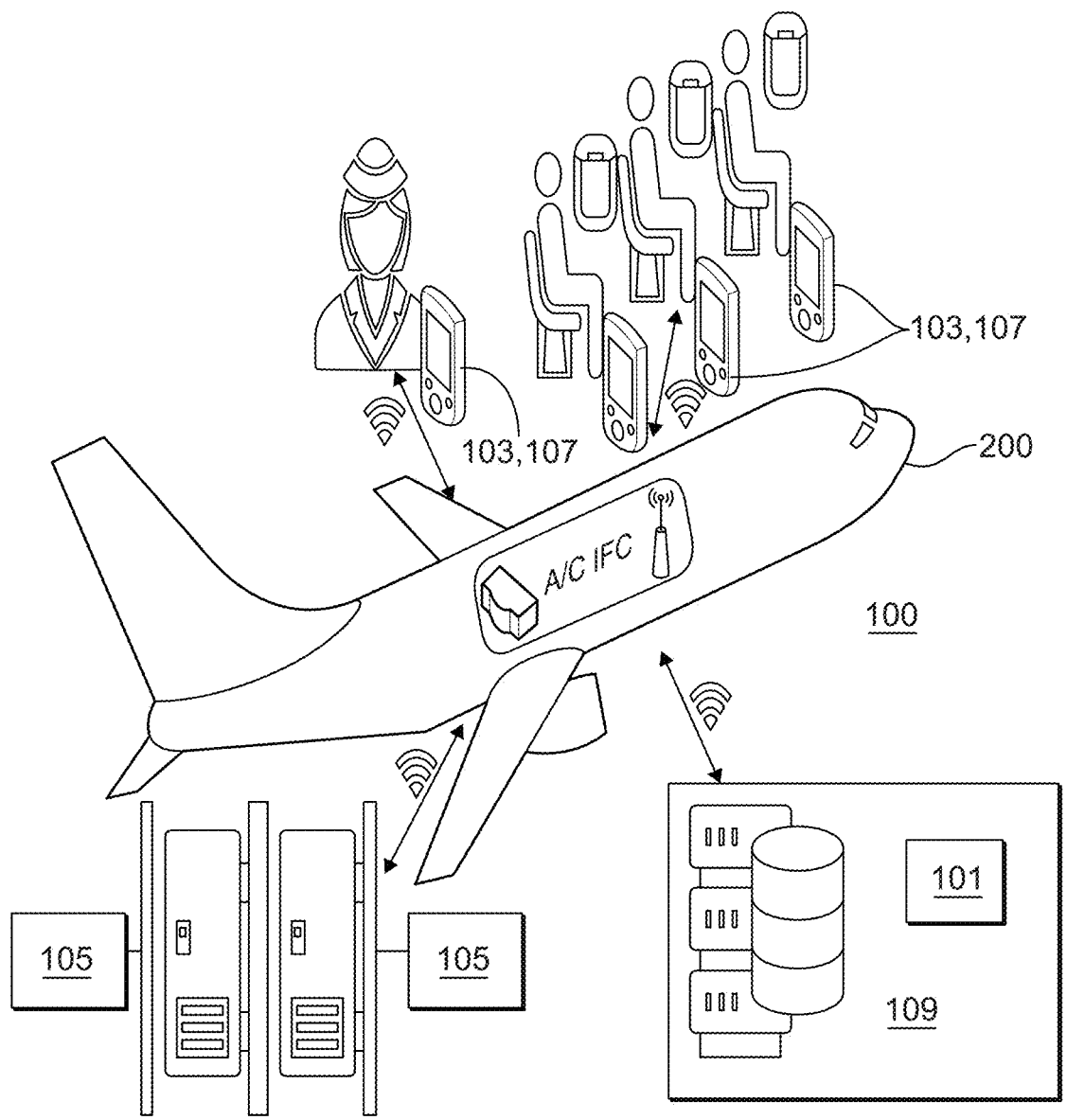
FIG. 2 is an aircraft schematic showing an example implementation of the embodiment of FIG. 1.
Figure 3A:
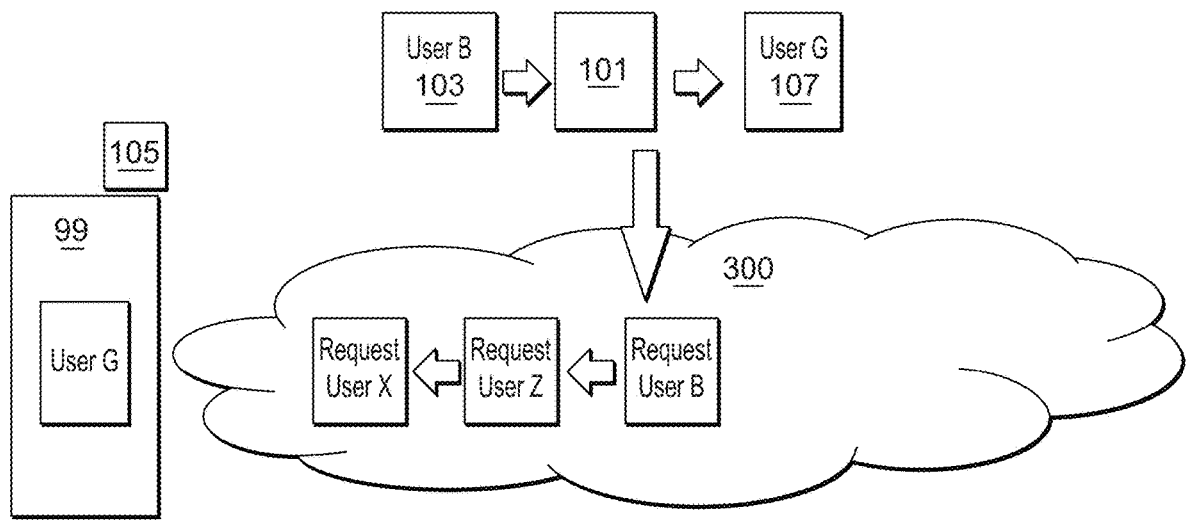
FIGS. 3A, 3B, and 3C are a schematics conceptually showing an embodiment of a virtual lavatory queue and a respective output by a queue module as the queue module iterates through the queue, for example.
Figure 3B:
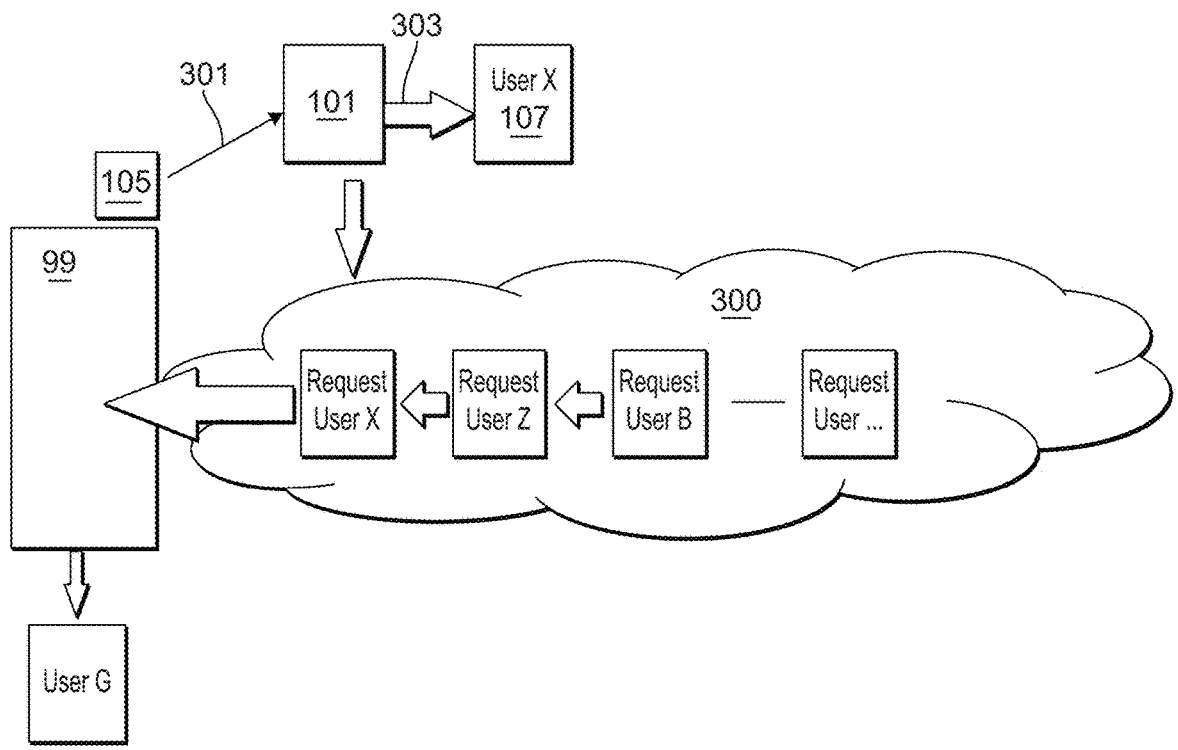
Figure 3C:
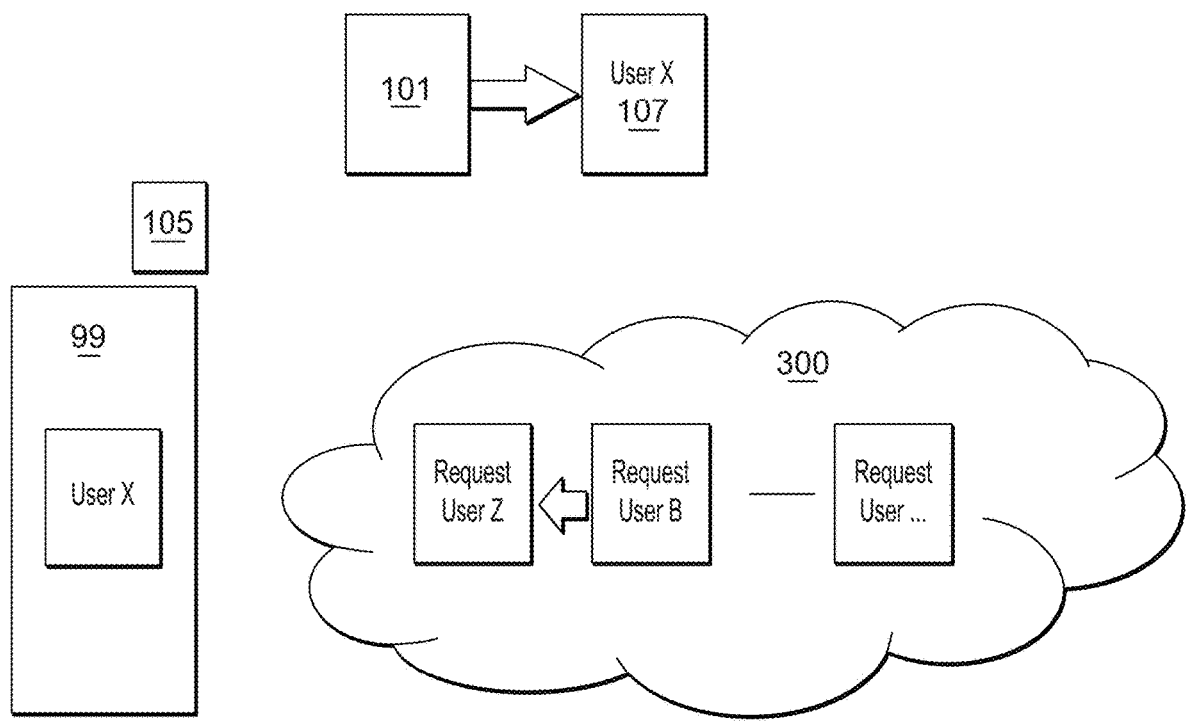

Referring to FIGS. 1 and 2, and additionally to FIGS. 3A-3C, a queue system 100 for a lavatory 99 of an aircraft 200 (e.g., as shown in FIG. 2) can include a queue module 101 configured to receive a request from a user input device 103 and to create and/or modify a virtual lavatory queue 300 (e.g., as shown in FIG. 3A) based on a request hierarchy (e.g., a time of receipt) of the request to position the request (and thus the user) in the virtual lavatory queue 300. The system 100 can also include a sensor 105 operatively connected to the queue module 101 and configured to output a state change signal 301 (e.g., as shown in FIG. 3B) indicative of a user leaving the lavatory 99.

The queue module 101 can be configured to receive the state change signal 301 from the sensor 105, iterate the virtual lavatory queue 300 in response to the state change signal 301, and output a vacancy indicator signal 303 to an indicator device 107 associated with a request that is at a front of the virtual lavatory queue 300 after iterating the virtual lavatory queue 300 to indicate to a user that it is the user's turn in the queue 300 (e.g., User X as shown in FIG. 3B).

In certain embodiments, the user input device 103 can be a personal electronic device (e.g., a smart phone or tablet) of a user (e.g., as shown in FIG. 2). The indicator device 107 can also be the personal electronic device of a user, e.g., as shown in FIG. 2. In certain embodiments, the system can include an app configured to operate on the personal electronic devices of the users to allow the users' devices to connect to the queue module 101, send requests, and receive indications. Any suitable request signal (e.g., a simple electrical signal, a data signal having specific request information) suitable to convey a request is contemplated herein.

In certain embodiments, the vacancy indication signal 303 can include a simple binary indication that it is time for the user to proceed to the lavatory. In certain embodiments, the vacancy indication signal can include other suitable information. For example, in an aircraft having multiple lavatories (e.g., with a sensor for each lavatory), in certain embodiments, the vacancy indication signal 303 can include an indication of which lavatory is assigned to the user that is next in line, or an indication of which of the multiple lavatories are available for use (as it is not necessary to assign a specific lavatory for the queue module to continue to function). Any suitable indication signals (e.g., a simple electrical signal, a data signal having specific indication information) suitable to convey an indication to a user is contemplated herein.

In certain embodiments, the user input device 103 can be a button or switch (e.g., physical or digital), for example, over head or on a seat back, e.g., as shown in FIG. 1. In certain embodiments, the user input device 103 and/or indicator device 107 can be a passenger infotainment system (e.g., integrated into a seat back). In certain embodiments, the indicator device 107 can be an indicator light configured to change state (e.g., from red to green) when receiving the vacancy indicator signal 303. Any suitable input device and indicator device is contemplated herein.

The sensor 105 can be a lavatory door sensor configured to output the state change signal when the lavatory door is unlocked and/or opened after being locked and/or closed. For example, the sensor 105 can be configured to sense if the lavatory door is ajar or unlocked. The queue module 101 can be configured to determine that if the lavatory door is open or unlocked for a certain threshold period of time (e.g., 15 seconds, 30 seconds, 1 minute, etc.), the previous user has left and the queue 300 can be iterated. The queue module 101 can be configured to determine that if the door is closed and/or locked for a threshold period of time (e.g., 15 seconds, 30 seconds, 1 minute, etc.), then once the door is next opened, the queue module 101 can immediately, or with a suitable delay for allowing the user to travel back to their seat, iterate the queue 300 to notify the next user waiting in the virtual queue (e.g., User Z in FIG. 3C). Any other suitable sensor (e.g., one or more cameras, one or more lavatory exit switches, a flush sensor, a motion sensor) is contemplated herein. Any suitable logic (e.g., flush plus 30 seconds) to determine vacancy of a lavatory is contemplated herein.

In certain embodiments, the request hierarchy can be a time-received logic such that a position of a request is based on a time the request was received (e.g., and timestamped) such that a later request is further back in the virtual lavatory queue 300 (e.g., as shown in FIG. 3A, the request associated with User B was received after the request associated with User Z, and thus put in line behind User Z). Any other or additional suitable hierarchy to order/reorder the requests in the queue is contemplated herein (e.g., based on an urgency indication, a medical condition, a user request, a seat class type). For example, a certain lavatory my provide priority access to certain users (e.g., first class users get priority at lavatory in the forward cabin). It is contemplated that a user can cancel or otherwise modify their request (e.g., to remove themselves from the virtual queue, causing the queue module 101 to iterate all requests behind the cancelled request forward one space).

As shown in FIG. 2, the queue module 101 can be hosted on an aircraft network device 109 (e.g., a server) and configured to receive requests and/or send vacancy indications over an aircraft wireless network. (e.g., a local network). Any other suitable location(s) for the queue module 101 is contemplated herein.

In certain embodiments, the system 100 can include the user input device 103 configured to output a request and the indicator device 107 configured to receive a vacancy indication signal. In certain embodiments, the system 100 does not include either, or one of the two. In certain embodiments, the user input device 103 and the indicator device 107 can be integrated together (e.g., be the same device or hosted on the same device), such as a touch screen device (a personal electronic device, or a mounted touch screen infotainment system, for example).

In certain embodiments, the system 100 can include a verification module 111 operatively connected to the queue module 101 and configured to verify a user is associated with the request that is at the front of the queue 300 (e.g., that the next person attempting to use the lavatory after User G is User X as shown in FIG. 3B). In certain embodiments, the verification module 111 can be configured to control a lock state (e.g., a motorized lock) and/or an open/close state (e.g., a motorized controllable door) such that if the verification module 111 verifies the user is associated with a request that is at the front of the queue, the verification module 111 is configured to unlock and/or open a lavatory door. Such a verification module 111 can be useful to ensure the integrity of the virtual queue system, but strict enforcement may not be necessary. For example, even if someone skips the line, it is contemplated that the queue module 101 can determine that the user is not a verified user, push the queue 300 back one space, and inform the next user in the queue 300 that the lavatory is occupied again and to wait. While verification and enforcement is not necessary, verification alone can be helpful in ensuring when a requesting user has verifiably used the lavatory, that their request can be removed from the queue 300. It is contemplated that aged requests that do not verify within a threshold time after iterating to the front of the queue 300 can be removed and the queue 300 iterated forward.

In certain embodiments, the verification module 111 can be configured to receive and compare identification data from the user to stored identification data (e.g., stored in the network device 109) associated with the request that is at the front of the queue 300. The identification data can include a barcode associated with the request (e.g., a QR code provided on an app on a personal electronic device), boarding pass data associated with a user who is associated with the request (e.g., a barcode on the boarding pass), or biometric data (e.g., facial recognition) associated with a user who is associated with the request. Any suitable hardware associated with the verification module 111 to scan the user identification data is contemplated herein (e.g., a camera, a barcode scanner).

In certain embodiments, the queue module 101 can be configured to estimate a time until each user will be able to use the lavatory and provide an indication to each respective user (e.g., via the indicator 107, e.g., in an app where the request was made). For example, the queue module 101 can be configured to assume an average time of use per user and multiply that value by the number of requests in front of a particular user to obtain the estimated time until use. Any other suitable estimations or logic is contemplated herein (e.g., informing each requesting user what their position in the virtual queue is, e.g., in real time, or allowing people to generally view how many people are awaiting to use the lavatory).

Any module(s) disclosed herein (e.g., queue module 101, verification module 103 described above) can include any suitable hardware and/or software module(s) configured to perform the function thereof. Any suitable common or separate hosting of modules, e.g., in whole or in portions over several hardware and/or software module(s), of any modules disclosed herein is contemplated herein.

In accordance with at least one aspect of this disclosure, a queue system, e.g., 100 for a lavatory of an aircraft can include a user input device configured to output a request to use an aircraft lavatory associated with a user, an aircraft network device having a queue module configured to receive the request from the user input device and to create and/or modify a virtual lavatory queue based on a re-quest hierarchy of the request to position the request in the virtual lavatory queue, a sensor operatively connected to the queue module and configured to output a state change signal indicative of a user leaving the lavatory, and an indicator device associated with each request configured to indicate to a user that it is the user's turn in the queue. The queue module can be configured to receive the state change signal from the sensor; iterate the virtual lavatory queue in response to the state change signal, and output a vacancy indicator signal to the indicator device associated with a request that is at a front of the virtual lavatory queue after iterating the virtual lavatory queue. The queue module and any other component can be as disclosed herein, e.g., as described above. For example, in certain embodiments, the user input device and the indicator device can be integrated and/or are the same device.

In accordance with at least one aspect of this disclosure, a non-transitory computer readable medium can have computer executable instructions configured to be executed by a computer to cause the computer to perform a method. The method can include receiving a request to use an aircraft lavatory from an aircraft occupant, placing the request in a queue, receiving a state change signal indicative of a previous user leaving the lavatory, iterating the queue forward by one request in response to the state change signal, and indicating to the user that the user's turn to use the lavatory when the request is at the front of the queue. The method can further include verifying a user attempting to enter the lavatory is the user associated with the request that is at the front of the queue.

In this pandemic era, it is desirable to manage the queue at the lavatory (a typical congestion point) and increase social distancing and cleanliness measures. Embodiments can include an automated lavatory latch system with wireless capability, connected through the aircraft Wi-Fi to a server running a module configured to control the occupancy of the lavatories on the aircraft and passengers waiting to use the lavatory. The specific airline's app can incorporate the capability for the passenger to click when they want to use the lavatory, the passenger stays seated until it is their turn in the queue, and the app notifies the passenger which lavatory is ready for their use. In certain embodiments, the passenger can unlock the door with a unique QR code (e.g., only their QR code will work at this point in time). For extra hygiene purposes, the lavatory can be motorized and open automatically once the QR is scanned. Additionally, inside the lavatory a wireless sensor could be incorporated to allow the passenger to close and lock the door without having to touch any surface. When the passenger opens the door when done, a sensor in the door can provide a signal that it is time to notify the next passenger in the queue and the process repeats (e.g., with the door relocking and setting for the next QR code).

In certain embodiments requiring an app, if a passenger doesn't have a smart device, they can notify the flight attendant who could put them in line via their handheld (and perhaps open the door with their device). The crew can also have the capability to lock all lavatory doors during take-off, landing or turbulence, and/or to provide override authority to allow out of turn access. In certain embodiments, the crew can be able to disable the queue system if it is not functioning properly. The system also can be configured to receive flight phase information from the aircraft and automatically seize the queue (e.g., during take-off, landing, or extreme turbulence) or to operate the queue.

Figure 4:
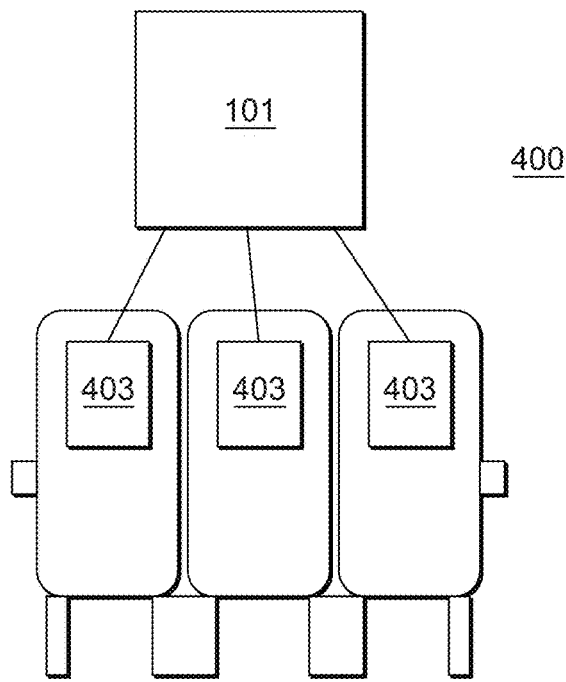
FIG. 4 is a schematic diagram of an embodiment of a system in accordance with this disclosure, shown having infotainment systems operatively connected to the queue module.
Figure 5:
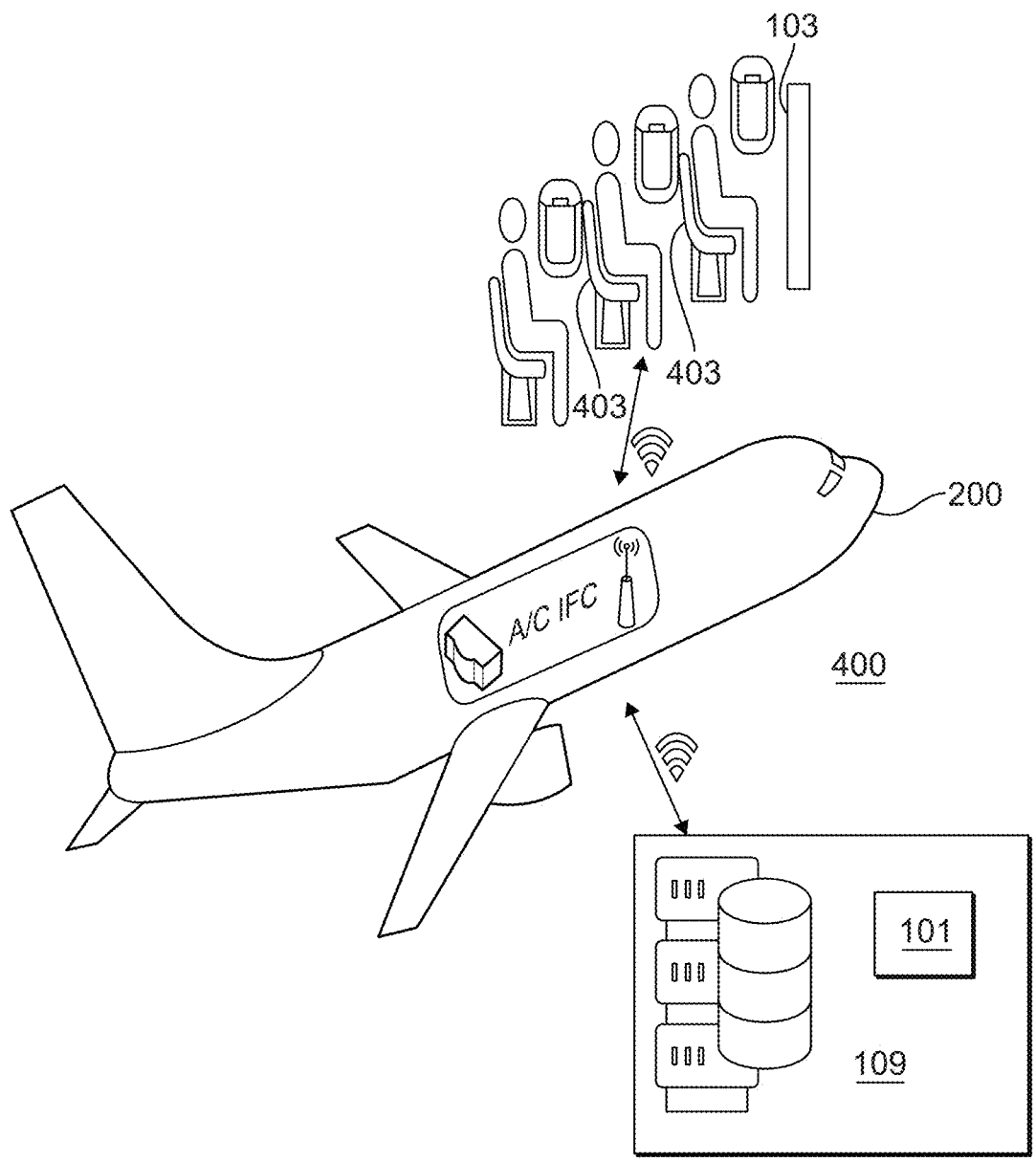
FIG. 5 is an aircraft schematic showing an example implementation of the embodiment of FIG. 4.

In accordance with at least one aspect of this disclosure, referring to FIGS. 4 and 5, another embodiment of a queue system 400 for a lavatory of an aircraft can include an infotainment system 403 configured to receive a user input and to output a request to use the lavatory associated with a seat or occupant. The system 400 can also include a queue module 101 (e.g., as disclosed above) operatively connected to the infotainment system 403. The queue module 101 can be configured to receive the request from the infotainment system 403 and to create and/or modify a virtual lavatory queue (e.g., as disclosed above) based on a request hierarchy of the request to position the request in the virtual lavatory queue, and output a vacancy indicator signal to the infotainment system 103 when the request is at a front of the virtual lavatory queue (e.g., as disclosed above). The infotainment system 103 can be configured to receive the vacancy indicator signal and display an indication (e.g., a pop-up message) to indicate to a user of the infotainment system 103 that it is the user's turn in the queue. The system 400 can be similar to the system 100, however, utilizing the infotainment system 403 (e.g., seatback infotainment system) without using a sensor on the lavatories, for example. It is contemplated that system 400 can include one or more sensors as in the system 100, and/or the system 100 can include the infotainment system 103 of system 400. Any suitable combination of the features of the one or more embodiments of a system 100, 400 are contemplated herein.

Figures 6, 7A:
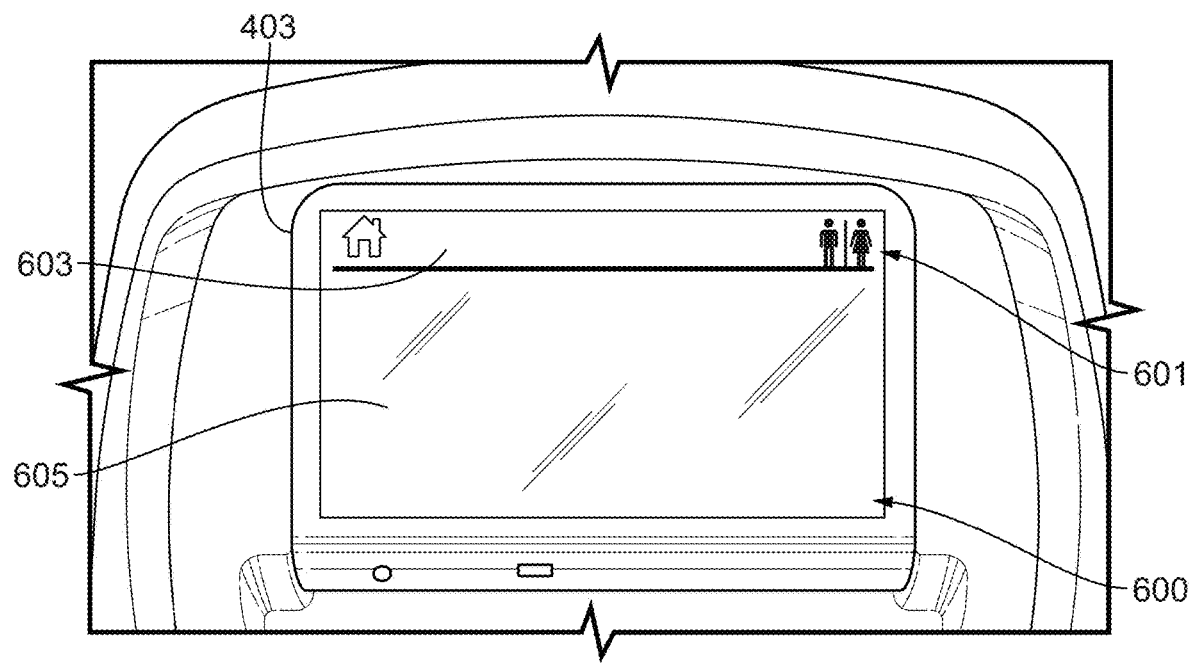
FIG. 6 shows an embodiment of a graphical user interface of the embodiment of FIG. 4.
FIGS. 7A, 7B, and 7C show progressive iterations of a lavatory pane of the GUI of FIG. 6.
Figure 7B:
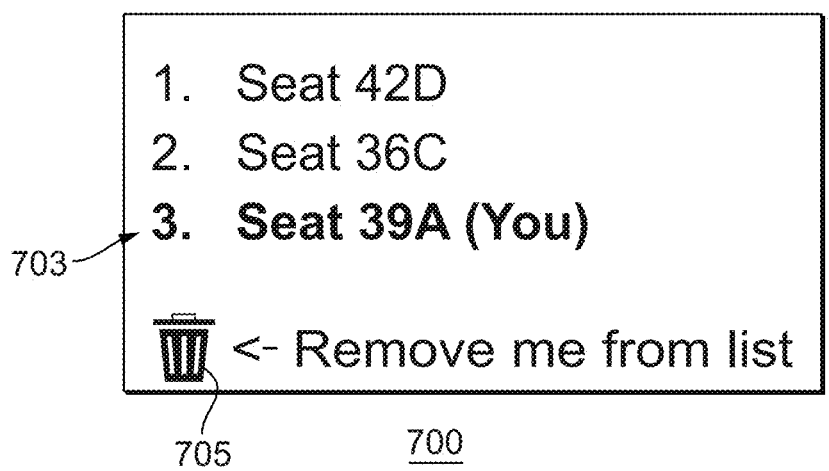
Figure 7C:
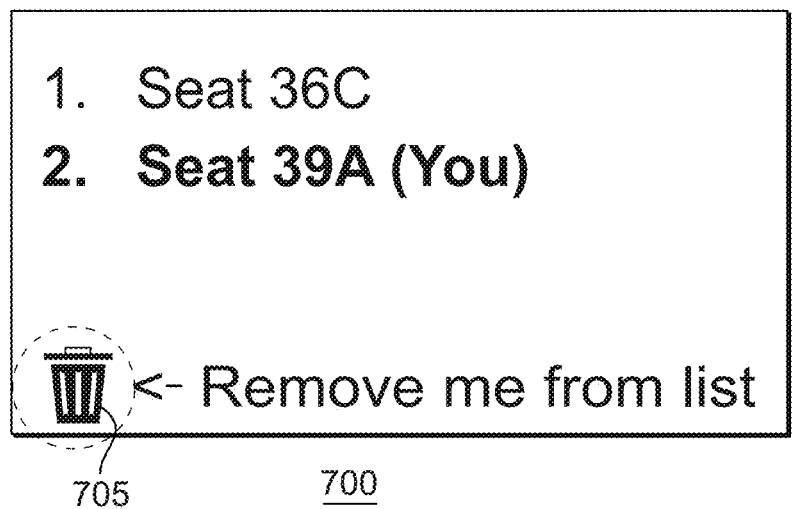

The infotainment system 103 can include a graphical user interface (GUI) 600 (e.g., displayed on a touchscreen) with one or more digital buttons 601 to be selected (e.g., via tapping the screen or using some other selection tool) by a user to either output the request to use the lavatory to the queue module 101 or to navigate to a lavatory pane 700, e.g., as shown in FIGS. 7A-7C to allow outputting of the request from the lavatory pane 700. As shown, the one or more digital buttons 601 can include a lavatory icon button (e.g., a man and woman symbol traditionally used on a unisex bathroom).

The GUI 600 can include a banner pane 603 having the one or more digital buttons 601 located therein. The banner pane 603 can either overlay a main pane 605 or divide a screen to have a main pane 605 and the banner pane 603. The banner pane 603 can be configured to drop down (e.g., over the main pane 605) with a user input (e.g., tapping the screen) and/or to autohide after a period of time without a user input (e.g., 10 seconds after last tap). The main pane 605 can be used to display information or entertainment (e.g., movies, etc.).

Referring additionally to FIGS. 7A-7C, in certain embodiments, selecting the lavatory icon button 601 can cause a lavatory pane 700 of the GUI 600 to pop up with a confirmation button 701 (e.g., a highlighted word button, e.g., "HERE" as shown) to send the request to use the lavatory to the queue module 101. The queue module 101 can be configured to output the virtual queue (e.g., as shown in FIGS. 7B and 7C) to the infotainment system 403 (e.g., in the form of a list 703, e.g., with other user information such as seat number as shown). In certain embodiments, e.g., as shown, the infotainment system 403 can be configured to display the virtual lavatory queue on the lavatory pane 700.

Figure 8A:
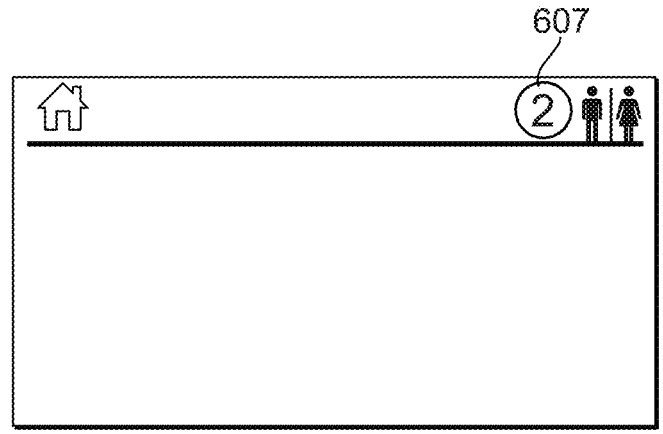
FIG. 8A shows the embodiment of a GUI of FIG. 6 after entering the queue, a place in line number being shown in the banner.
Figure 8B:
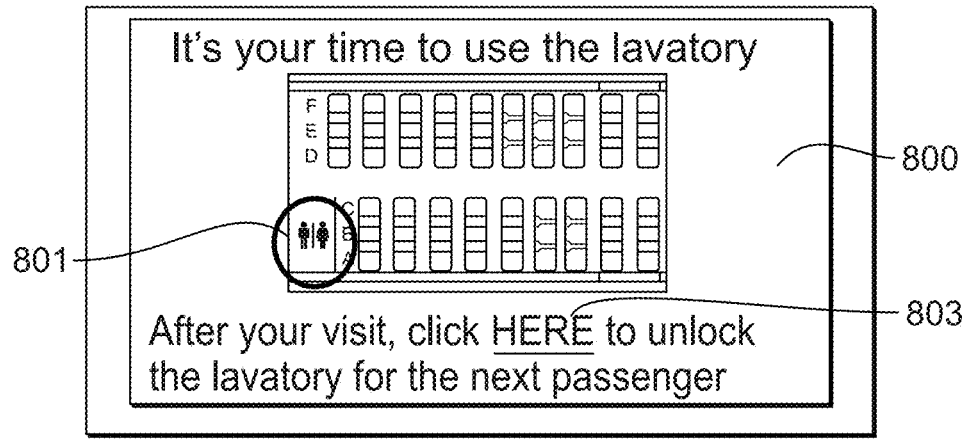
FIG. 8B shows an embodiment of a pop-up alert pane of the GUI that alerts the user that it is their time to use the lavatory, showing providing an end button to indicate that the user is finished and/or back in their seat to allow the queue to iterate.

In certain embodiments, referring additionally to FIGS. 8A and 8B, more generally, the queue module 101 can be configured to output lavatory information. The infotainment system 403 can be configured to receive the lavatory information from the queue module 101 and to display the lavatory information (e.g., on in any suitable pane or portion of GUI 600). For example, the lavatory information can include a number 607 indicating a position in the virtual lavatory queue that the user is in. Such position information can be viewed in the banner pane 603, for example. Any suitable information (e.g., which lavatory, directions thereto, position in line, etc.) and any suitable display location (e.g., in a pop-up, in a banner, in a main pane, etc.) is contemplated herein.

The GUI 600 can include a removal button 705 on the lavatory pane 700 configured to send a removal signal when selected to the queue module 101 to remove the associated seat and/or user from the virtual lavatory queue. In certain embodiments, the lavatory pane 700 can be closed or minimized by the user (e.g., by tapping a close button, not shown, or by tapping away from the lavatory pane 700, or in any other suitable manner).

Referring to FIG. 8B, the GUI 600 can be configured to generate a pop-up alarm pane 800 upon receiving the vacancy indicator signal indicating that the user is first in line in the virtual lavatory queue. In certain embodiments, the queue system 101 can be configured to output lavatory specific instructions 801 to the infotainment system 403. The infotainment system 403 can be configured to provide the lavatory specific instructions 801 in the pop-up alarm pane 800, e.g., as shown, to instruct the user which lavatory to use and/or provide directions to the lavatory to be used. The pop-up alarm pane 800 can be configured to take over the whole screen and/or can require the user to click a button that they are on the way to the lavatory within a defined time period or lose their turn in the queue, e.g., the queue iterates. Certain embodiments can have a manual input of how much time is estimated to be needed in the lavatory if more than a standard allowed. In certain embodiments, a button in the lavatory can allow a user to add time to allow an accurate track of when the next user can expect to use the lavatory.

Figure 9A:
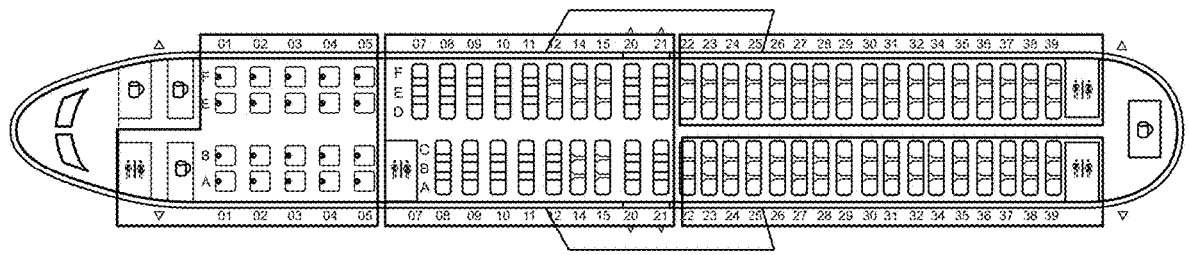
FIG. 9A shows an embodiment of a grouping logic used by the queue module to determine which lavatory of a plurality of lavatories a particular user is authorized and notified to use, wherein the logic shown is based on general seat location.
Figure 9B:
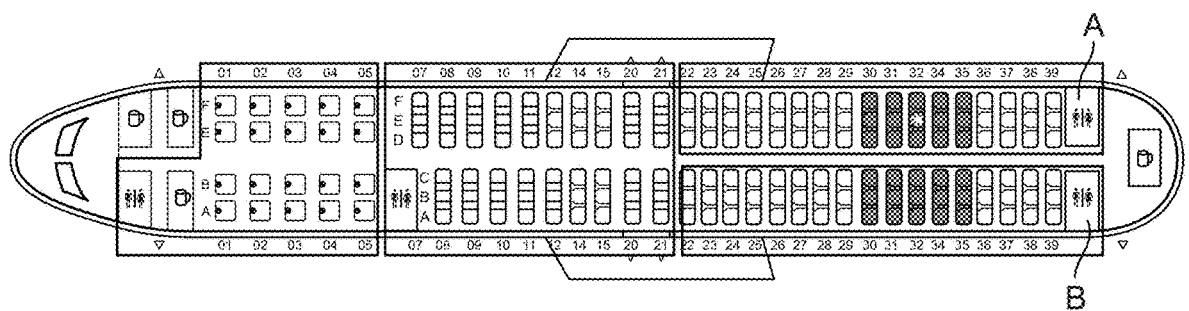
FIG. 9B shows an embodiment of a grouping logic used by the queue module to determine which lavatory of a plurality of lavatories a particular user is authorized and notified to use, wherein the logic shown is based on general seat location and also based on a proximity to an occupant who is suspected to have a transmissible disease (e.g., COVID-19).

Referring additionally to FIGS. 9A and 9B, in certain embodiments, the queue module 101 can be configured to determine which lavatory of a plurality of lavatories the seat or occupant is authorized to use based on one or more assignment criteria. For example, the assignment criteria can be or include one or more of seat location of the requesting user (e.g., as shown in FIG. 9A), operability of one or more lavatories, and/or an aisle congestion due to crew and/or crew carts. In certain embodiments, e.g., as shown in FIG. 9B, the assignment criteria can be based on a defined proximity to (e.g., within the two rows front and aft of) an occupant suspected of having a transmissible disease (e.g., COVID-19, shown as asterisk *). The assignment criteria can also be such that a common lavatory used by an occupant suspected of having a transmissible disease such that a requesting user who has already used a lavatory that was also used by an occupant suspected of having a transmissible disease will be assigned the same lavatory for the duration of the flight.

The alarm pane 800 can include an end button 803 configured to cause the infotainment system 403 to send a finished signal to the queue module 101 when selected by the user to cause the queue module 101 to iterate the queue. The alarm pane 800 can also be closed upon selecting the end button 803 allowing the user to indicate to that the user is finished using the lavatory. In certain embodiments, the alarm pane 800 will not disappear or allow other use of the infotainment system 403 until the end button 803 is selected to ensure the user notifies the queue module 101 in a timely manner.

While certain panes of a GUI have been described above, any other suitable GUI's or panes thereof are contemplated herein. Any suitable distribution of physical buttons and digital buttons are contemplated herein. Any suitable logic to operate the queue is contemplated herein.

In accordance with at least one aspect of this disclosure, an infotainment system, e.g., 403 for a seatback of an aircraft 200 can be configured to accept inputs for and to display information from a virtual lavatory queue module 101 on the aircraft 200 to allow an occupant to enter a virtual lavatory queue. The infotainment system can include a graphical user interface (GUI), e.g., 600 configured to allow the occupant to send a request to use a lavatory, alert the occupant when and/or which lavatory is available for use by the occupant, and require the occupant to provide an input to the GUI to cause the infotainment system to send an indication to the virtual lavatory queue module that the occupant has returned to their seat to cause the virtual lavatory queue module to iterate the virtual lavatory queue. The infotainment system can be utilized in any suitable aircraft, and/or have any suitable components (e.g., a touchscreen). An aircraft can include a plurality (e.g., one for each occupant or passenger) of infotainment systems as disclosed herein, e.g., as described above.

Certain embodiments can include a banner that can be a menu that appears (e.g., by tapping screen or button) on demand over the normal GUI pane that is playing a movie or other media, for example (e.g., all lavatory queue information of the virtual queue that the user is in). Embodiments can include a lavatory pane that shows all lavatory queue information. Any suitable number of separate virtual queues (e.g., a separate queue for each lavatory) are contemplated herein to be created and/or modified by the queue module. In certain embodiments, a passenger can only look into the queue that passenger is in, e.g., if passenger X is in queue A for lavatory A, passenger X can therefore not look into information regarding lavatory B and queue B, for example.

Embodiments of a lavatory pane can be on the main pane or shown only after clicking lavatory icon (such that the lavatory pane shows in the main pane only after clicking). In certain embodiments, the user can click to be removed from the queue, e.g., when the user returns to the seat to iterate the list, or at any time prior. Certain embodiments can include a quick indicator showing the user's line position on the banner. Embodiments can include a clear button to click after returning, e.g., flashing on screen and disabling the infotainment system until clicked to ensure users click the button to iterate the queue.

In embodiments, the system can control which bathrooms can be used by certain people, or people in certain locations based on either information about individuals (health information, handicap information) or based on location of seats (e.g., aft seats go to one of aft lavatories, one side of airplane goes to lavatories on the same side). In certain embodiments, people suspected to have a transmissible disease or those who have interacted sufficiently with such a person can all go to the same lavatory to isolate them. Embodiments can use real time data to decide where people go (e.g., to avoid beverage cart, e.g., such that all people in front of beverage cart are assigned to a lavatory in front of the cart).

As shown, in certain embodiments, a lavatory sign can be displayed in a menu of an in-flight entertainment system. By clicking the sign, one can enter the virtual lavatory queue. In certain embodiments, a user can click to add themselves to the waiting line, they can then be added to the line, their position in line can be shown and updated, their position can also be shown in the top menu, a pop-up menu can alarm them when they are first in line, and after they visit to the lavatory, they may be required to click to remove themselves from the list to iterate the queue.

Embodiments can include a virtual queue (e.g., a digital waiting line/list) as part of an intelligent system. To prevent movements through the airplane as much as possible, the aircraft can be split into sections. For example, seat 10A as shown may be only allowed to use the lavatory in the front. In case someone on board is suspected to carry the COVID-19 virus, for example, the system can be able to decide (based on seat number) to which lavatory one has to go. In this example shown, the infected person (e.g., as shown in FIG. 9B as (*)) and all passengers in sufficiently nearby rows must go to lavatory A, and other people in the same area but not sufficiently close can be redirected to lavatory B. In certain embodiments, the system can have certain logic rules. For example, if an infected passenger has been to lavatory XX, then all passengers that have been to lavatory XX shall be required to go to lavatory XX henceforth.

With COVID-19, it is unwanted to have people wait in line of the lavatories when they are occupied, since contact moments (between passengers) need to be minimized. Embodiments provide a digital waiting line for which passengers can sign up via the personal entertainment screen in their seat. Every passenger can press the "Toilet" button on the screen and based on the order of passengers doing so, a waiting line will be formed. The passenger first in line can get a pop-up in their screen that it is their turn to go to the toilet. Other passengers can see their position in the waiting list. When the passenger returns to their seat, he/she can be required to "confirm" their toilet visit is ended. The person next in line can get the same pop-up message and so on.

In certain embodiments, to make sure that people are waiting in line unnecessarily because the person who visited the toilet forgot to confirm their toilet visit, the seat number can be displayed of all passengers waiting in the list. This way, other people can visually check whether people have returned to their seat. If so, he/she can tell the person to confirm their toilet visit or ask the flight attendant to do so. In certain embodiments, a timer (e.g., 10 minutes) can be used in case someone forgets to press the end button.

Embodiments can assign specific toilets to be used by specific areas on board. A map can be part of the popup, showing the specific lavatory that can be used. By doing so, the system can limit the movement of passengers to a specific area on board. This also helps when someone on board needs to be quarantined because he/she might be infected by an infectious disease such as COVID-19. The virtual queue can also monitor which passengers (or more anonymized: which seating numbers) have been to the same toilet as the infected person. The system can be intelligent in such a way that it can send the passengers who have been to the same toilet as the passenger carrying the infected disease to the same toilet as well as the persons who were in the nearby seats of the passenger carrying the infected disease, and other passengers who are seated in the same area, but that have not been to this toilet and are not within the "nearby seats range" can be sent to another toilet.

In certain embodiments, if there are games that can be played on board in which an opponent can be chosen or assigned based on seat number, the system and methods as disclosed herein can use the same sort of connection between seats to implement the disclosed system and methods. This is an example of a system where passengers can be interconnected, and such interconnection can be utilized. This may only need a software implementation and then it can already be implemented in existing seating products. Embodiments can also be used in general passenger monitoring, which is a new field of expertise.

Certain embodiments can include a light above the passenger's seat that is first in line for the toilet. In this way it is easy for passengers and flight attendants to see who is authorized to go to the lavatory. In certain embodiments, the light above the seat can also be configured to indicate whether someone has left their seat and whether everyone has fastened their seatbelt. Different situations can be indicated with different LED colors. Any suitable situation is contemplated herein.

As disclosed above, embodiments can organize and/or control the usage of the lavatory. The traditional procedure is to stand in the aisle or the galley and wait until your turn, close to others in a tight space. Embodiments solve this issue, and many others, and helps airlines comply with the social distancing measures in effect throughout the world due to infectious diseases, in this case COVID-19.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A queue system for a lavatory of an aircraft, comprising:
    an infotainment system configured to receive a user input and to output a request to use the lavatory associated with a seat or occupant; and
    a queue module operatively connected to the infotainment system and configured to:
        receive the request from the infotainment system and to create and/or modify a virtual lavatory queue based on a request hierarchy of the request to position the request in the virtual lavatory queue; and
        output a vacancy indicator signal to the infotainment system when the request is at a front of the virtual lavatory queue,
    wherein the infotainment system is configured to receive the vacancy indicator signal and display an indication to indicate to a user of the infotainment system that it is the user's turn in the queue, wherein the infotainment system includes a graphical user interface (GUI) with one or more digital buttons to be selected by a user to either output the request to use the lavatory to the queue module or to navigate to a lavatory pane to allow outputting of the request from the lavatory pane, wherein the GUI is configured to generate a pop-up alarm pane upon receiving the vacancy indicator signal indicating that the user is first in line in the virtual lavatory queue, wherein the queue system is configured to output lavatory specific instructions to the infotainment system, wherein the infotainment system is configured to provide the lavatory specific instructions in the pop-up alarm pane to instruct the user which lavatory to use and/or provide directions to the lavatory to be used, wherein the queue system is configured to determine which lavatory of a plurality of lavatories the seat or occupant is authorized to use based on one or more assignment criteria, wherein the assignment criteria are based on a defined proximity to an occupant suspected of having a transmissible disease, or a common lavatory used by an occupant suspected of having a transmissible disease such that a requesting user who has already used a lavatory that was also used by an occupant suspected of having a transmissible disease will be assigned the same lavatory for the duration of the flight.

2. The system of claim 1, wherein the one or more digital buttons includes a lavatory icon button.

3. The system of claim 2, wherein the GUI includes a banner pane having the one or more digital buttons located therein, wherein the banner pane either overlays a main pane or divides a screen to have a main pane and the banner pane.

4. The system of claim 3, wherein the banner pane is configured to drop down with a user input and/or to autohide after a period of time without a user input.

5. The system of claim 1, wherein the queue module is configured to output lavatory information and the infotainment system is configured to receive the lavatory information from the queue module and to display the lavatory information.

6. The system of claim 5, wherein the lavatory information includes a number indicating a position in the virtual lavatory queue.

7. The system of claim 2, wherein selecting the lavatory icon button causes a lavatory pane of the GUI to pop up with a confirmation button to send the request to use the lavatory to the queue module.

8. The system of claim 7, wherein the queue module is configured to output the virtual queue to the infotainment system, wherein the infotainment system is configured to display the virtual lavatory queue on the lavatory pane.

9. The system of claim 8, wherein the GUI includes a removal button on the lavatory pane configured to send a removal signal when selected to the queue module to remove the associated seat and/or user from the virtual lavatory queue.

10. The system of claim 9, wherein the lavatory pane can be closed or minimized by the user.

11. The system of claim 1, wherein the assignment criteria is or includes one or more of seat location of the requesting user, operability of one or more lavatories, and/or an aisle congestion due to crew and/or crew carts.

12. The system of claim 1, wherein the alarm pane includes an end button configured to cause the infotainment system to send a finished signal to the queue module when selected by the user to cause the queue module to iterate the queue, wherein the alarm pane is closed upon selecting the end button allowing the user to indicate to that the user is finished using the lavatory.

13. A queue system for a lavatory of an aircraft, comprising:
an infotainment system configured to receive a user input and to output a request to use the lavatory associated with a seat or occupant; and
a queue module operatively connected to the infotainment system and configured to:
receive the request from the infotainment system and to create and/or modify a virtual lavatory queue based on a request hierarchy of the request to position the request in the virtual lavatory queue; and
output a vacancy indicator signal to the infotainment system when the request is at a front of the virtual lavatory queue,
wherein the infotainment system is configured to receive the vacancy indicator signal and display an indication to indicate to a user of the infotainment system that it is the user's turn in the queue, wherein the infotainment system includes a graphical user interface (GUI) with one or more digital buttons to be selected by a user to either output the request to use the lavatory to the queue module or to navigate to a lavatory pane to allow outputting of the request from the lavatory pane, wherein the GUI is configured to generate a pop-up alarm pane upon receiving the vacancy indicator signal indicating that the user is first in line in the virtual lavatory queue, wherein the queue system is configured to output lavatory specific instructions to the infotainment system, wherein the infotainment system is configured to provide the lavatory specific instructions in the pop-up alarm pane to instruct the user which lavatory to use and/or provide directions to the lavatory to be used, wherein the queue system is configured to determine which lavatory of a plurality of lavatories the seat or occupant is authorized to use based on one or more assignment criteria, wherein the assignment criteria includes an aisle congestion due to crew and/or crew carts.

* * * * *